(12) United States Patent
Kwon

(10) Patent No.: US 9,111,155 B2
(45) Date of Patent: Aug. 18, 2015

(54) RFID READER AND METHOD OF CONTROLLING THE SAME

(75) Inventor: Bong-hyen Kwon, Changwon (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 936 days.

(21) Appl. No.: 13/157,864

(22) Filed: Jun. 10, 2011

(65) Prior Publication Data

US 2011/0304459 A1    Dec. 15, 2011

(30) Foreign Application Priority Data

Jun. 15, 2010   (KR) .................. 10-2010-0056753

(51) Int. Cl.
*H04Q 5/22* (2006.01)
*G06K 7/10* (2006.01)
*G06K 19/07* (2006.01)

(52) U.S. Cl.
CPC ........ *G06K 7/10297* (2013.01); *G06K 7/10039* (2013.01); *G06K 19/0723* (2013.01)

(58) Field of Classification Search
CPC .......... G06K 7/10297; G06K 19/0723; G06K 7/10039; G06K 7/0008; G01S 13/84; G01S 3/28; G01S 13/75
USPC .............. 340/568.8, 10.1, 10.34, 12.51, 10.2, 340/10.4; 370/320, 465; 455/67.13, 295
See application file for complete search history.

(56) References Cited

U.S. PATENT DOCUMENTS

| | | | |
|---|---|---|---|
| 7,472,835 B2 | 1/2009 | Diorio et al. | |
| 2008/0055091 A1 | 3/2008 | Song et al. | |
| 2008/0111663 A1* | 5/2008 | Yogeeswaran et al. | 340/10.2 |
| 2009/0086869 A1* | 4/2009 | Bae et al. | 375/360 |
| 2011/0109440 A1* | 5/2011 | Muehlmann | 340/10.1 |
| 2011/0248834 A1* | 10/2011 | Warner et al. | 340/10.34 |
| 2011/0304439 A1* | 12/2011 | Panchalan et al. | 340/10.3 |

FOREIGN PATENT DOCUMENTS

| | | |
|---|---|---|
| CN | 101377820 A | 3/2009 |
| CN | 101655923 A | 2/2010 |
| JP | 2008-234265 A | 10/2008 |
| KR | 10-2007-0115130 A | 12/2007 |
| KR | 20080100581 A | 11/2008 |
| KR | 10-2009-0025873 A | 3/2009 |

OTHER PUBLICATIONS

Qiasi Luo et al., 2009 IEEE International conference on RFID Apr. 27, 2009 pp. 7-14; "A Low-Power Dual-Clock Strategy for Digital Circuits of EPC Gen2 RFID tag".

* cited by examiner

*Primary Examiner* — Hoi Lau

(57) ABSTRACT

A radio frequency identification (RFID) reader and a method of controlling the RFID reader are provided. The RFID reader includes a link frequency calculator which calculates a link frequency by using a signal transmitted from a tag and a sampling signal; a first decoder which converts the signal transmitted from the tag into a first signal or a second signal having a different value from the first signal; a decoding controller which outputs a mode signal representing a format used to decode the signal converted in the first decoder; and a second decoder which decodes the converted signal according to the mode signal.

20 Claims, 11 Drawing Sheets

FIG. 3

| DR: Divide Ratio | TRcal (μs +/−1%) | BLF:Link Frequency (kHz) | Frequency Tolerance FT(nominal temp) | Frequency Tolerance FT(extended temp) | Frequency variation during backscatter |
|---|---|---|---|---|---|
| 64/3 | 33.3 | 640 | +/− 15% | +/− 15% | +/− 2.5% |
| | 33.3 < TRcal < 66.7 | 320 < BLF < 640 | +/− 22% | +/− 22% | +/− 2.5% |
| | 66.7 | 320 | +/− 10% | +/− 15% | +/− 2.5% |
| | 66.7 < TRcal < 83.3 | 256 < BLF < 320 | +/− 12% | +/− 15% | +/− 2.5% |
| | 83.3 | 256 | +/− 10% | +/− 10% | +/− 2.5% |
| | 83.3 < TRcal ≤ 133.3 | 160 ≤ BLF < 256 | +/− 10% | +/− 12% | +/− 2.5% |
| | 133.3 < TRcal ≤ 200 | 107 ≤ BLF < 160 | +/− 7% | +/− 7% | +/− 2.5% |
| | 200 < TRcal ≤ 255 | 95 ≤ BLF < 107 | +/− 5% | +/− 5% | +/− 2.5% |
| 8 | 17.2 ≤ TRcal < 25 | 320 < BLF ≤ 465 | +/− 19% | +/− 15% | +/− 2.5% |
| | 25 | 320 | +/− 10% | +/− 22% | +/− 2.5% |
| | 25 < TRcal < 31.25 | 256 < BLF < 320 | +/− 12% | +/− 15% | +/− 2.5% |
| | 31.25 | 256 | +/− 10% | +/− 15% | +/− 2.5% |
| | 31.25 < TRcal < 50 | 160 < BLF < 256 | +/− 10% | +/− 10% | +/− 2.5% |
| | 50 | 160 | +/− 7% | +/− 12% | +/− 2.5% |
| | 50 < TRcal ≤ 75 | 107 ≤ BLF < 160 | +/− 7% | +/− 7% | +/− 2.5% |
| | 75 < TRcal ≤ 200 | 40 ≤ BLF < 107 | +/− 4% | +/− 5% | +/− 2.5% |

FIG. 4
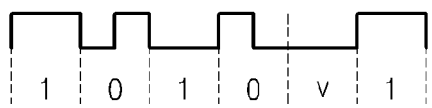
FM0 Preamble (TRext = 0)
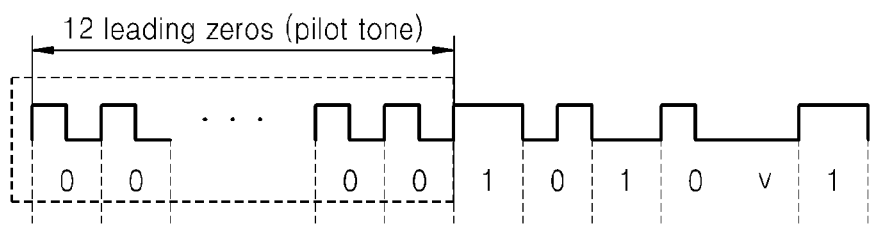
FM0 Preamble (TRext = 1)
FIG. 5
Miller Preamble (TRext = 0)
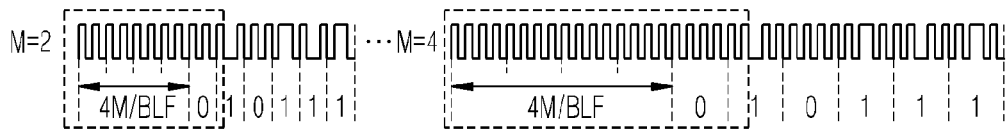
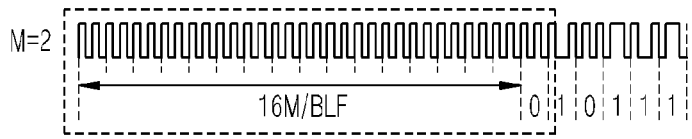
Miller Preamble (TRext = 1)
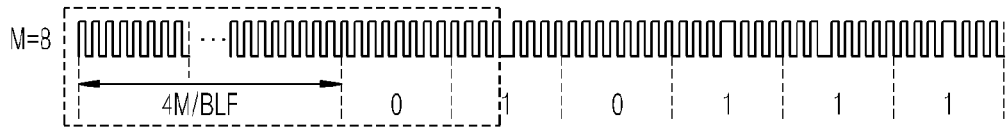
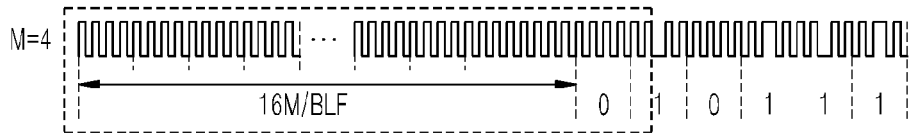
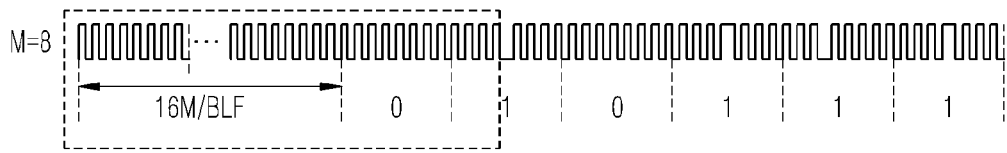

RFID READER AND METHOD OF CONTROLLING THE SAME

CROSS-REFERENCE TO RELATED PATENT APPLICATION

This application claims priority from Korean Patent Application No. 10-2010-0056753, filed on Jun. 15, 2010, in the Korean Intellectual Property Office, the disclosure of which is incorporated herein in its entirety by reference.

BACKGROUND

1. Field

Apparatuses and methods consistent with exemplary embodiments relate to a radio-frequency identification (RFID) reader and controlling the RFID reader.

2. Description of the Related Art

RFID technology may be utilized for automatically identifying an object. The RFID technology is a kind of wireless identification technology directed to a system for receiving/transmitting various data wirelessly via a certain frequency band.

A magnetic or barcode identification system requires a certain exterior representation that may be damaged or abraded, which may reduce a identification rate over time. However, an RFID system including an RFID tag (hereinafter, referred to as tag) and an RFID reader (hereinafter, referred to as reader) may address the above problem.

The RFID system has been used in various automation businesses, management of physical distribution, and the distribution industry, for example, the RFID system may be used in credit cards/debit cards, pre-paid/deferred payment bus and subway cards, parking cards, mail-delivery systems, and history table of animals.

SUMMARY

One or more exemplary embodiments provide an RFID reader that may be applied to various backscatter link frequencies, and a method of controlling the RFID reader.

According to an aspect of an exemplary embodiment, there is provided an RFID reader including: a link frequency calculator which calculates a link frequency by using a signal transmitted from a tag and a sampling signal; a first decoder which converts the signal transmitted from the tag into a first signal or a second signal having a different value from the first signal; a decoding controller which outputs a mode signal representing a format used to decode the signal converted in the first decoder; and a second decoder which decodes the converted signal according to the mode signal.

The link frequency calculator may include: a sign determiner which detects a change in a sign of the signal transmitted from the tag, the sign being determined as plus if a value of the signal is above a threshold and as minus if the value of the signal is below the threshold; a counter which counts a number of sampling signal applications while the sign of the signal is maintained constant; and a frequency calculator for calculates the link frequency based on the counting number.

The link frequency calculator may further include an average value calculator that calculates an average value of the counted number of the sampling signal applications while the sign of the signal is maintained constant, wherein the frequency calculator calculates the link frequency by using the average value.

The frequency calculator may calculate a tolerance based on the calculated link frequency.

The first decoder may count a number of sampling signal applications, from a time point when the sign of the signal transmitted from the tag changes to a next time point when the sign of the signal transmitted from the tag changes again, and calculates a conversion value by adding 1 if the value of the signal transmitted from the tag is greater than 0 and subtracting 1 if the value of the signal transmitted from the tag is smaller than 0 at time points when a sampling signal application occurs while the number of the sampling signal applications is counted.

The first decoder may receive a reference value from the decoding controller, which is a reference for converting the signal transmitted from the tag, converts the signal transmitted from the tag into the first signal if the conversion value is less than the reference value, and converts the signal transmitted from the tag to the second signal if the conversion value is equal to or greater than the reference value and if (the link frequency−tolerance)≤s≤(the link frequency+the tolerance).

The first decoder may count the number of the sampling signal applications until the sign of the signal transmitted from the tag changes again, and calculates the conversion value while the number of the sampling signal applications is counted if (the link frequency−the tolerance)>the number of the sampling signal applications.

The first decoder may convert the signal transmitted from the tag into one of the first signal, the second signal, and a third signal, the third signal having a different value from a value of the first signal and a value of the second signal.

The RFID reader may further include a noise determiner which distinguishes noise from a signal encoded at the tag, in the signal transmitted from the tag.

The first decoder may convert the encoded signal into the first signal or the second signal.

The RFID reader may further include a preamble searching unit which searches for a preamble section in the encoded signal.

The RFID reader may perform communication with the tag based on the BLF calculated by the link frequency calculator.

According to an aspect of another exemplary embodiment, there is provided a method of controlling an RFID reader, the method including: calculating a link frequency by using a signal transmitted from a tag; performing first decoding which converts the signal transmitted from the tag into a first signal or a second signal having a different value from the first signal; determining a decoding format that is used to decode the converted signal; and performing second decoding which decodes the converted signal according to the determined decoding format.

The calculating the link frequency may include detecting whether a sign of the signal transmitted from the tag changes between plus and minus, the sign being determined as plus if a value of the signal is above a threshold and as minus if the value of the signal is below the threshold; counting a number of sampling signal applications while the sign of the signal does not change; and calculating the link frequency based on the counted number.

The calculating the link frequency may include repeating the calculating the number of the sampling signal applications for a predetermined number of times; calculating an average value of the number of the sampling signal applications; and calculating the link frequency by using the average value.

The method may further include distinguishing noise from a signal encoded at the tag, in the signal transmitted from the tag.

The performing the first decoding may include converting the encoded signal into the first signal or the second signal.

The method may further include searching for a preamble in the encoded signal.

According to an aspect of still another exemplary embodiment, there is provided an RFID reader including: a sampling signal generator which generates a sampling signal; a link frequency calculator which calculates a link frequency by using pulses, that are repeated for a predetermined period in a preamble section included in a signal transmitted from a tag, and the sampling signal; and a decoding controller which decodes the signal transmitted from the tag according to the calculated link frequency.

The link frequency calculator may calculate the link frequency by counting a number of sampling signal applications within a pulse width of the pulse that is repeated.

BRIEF DESCRIPTION OF THE DRAWINGS

The above and other aspects will become more apparent by describing in detail exemplary embodiments with reference to the attached drawings, in which:

FIG. 3 is a table of backscatter link frequencies according to DR values and TRcal values in the RFID tag, according to an exemplary embodiment;

FIG. 4 is a timing diagram of a preamble in a tag signal, according to an exemplary embodiment;

FIG. 5 is a timing diagram of a preamble in a tag signal, according to another exemplary embodiment;

DETAILED DESCRIPTION OF EXEMPLARY EMBODIMENTS

Figure 1:
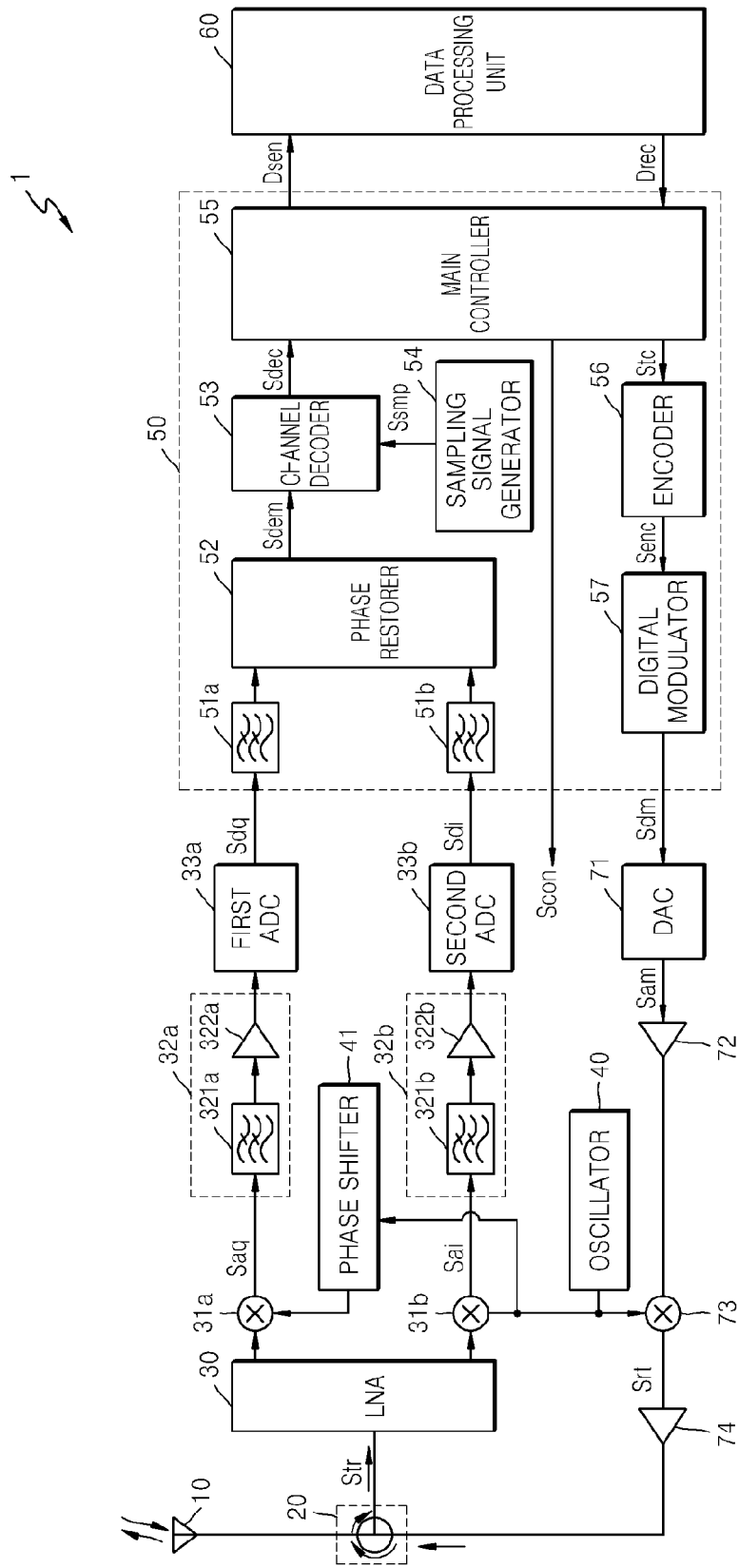
FIG. 1 is a diagram of an RFID reader according to an exemplary embodiment.

Hereinafter, exemplary embodiments will be described in detail with reference to the attached drawings. Like reference numerals in the drawings denote like elements.

Unless otherwise defined, all terms (including technical and scientific terms) used herein have the same meaning as commonly understood by one of ordinary skill in the art to which the exemplary embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The exemplary embodiments follow the RFID specification defined in ISO/IEC WD 18000-6REV1 as a standard protocol.

FIG. 1 illustrates a diagram of an RFID reader 1 according to an exemplary embodiment.

Referring to FIG. 1, the reader 1 of the current exemplary embodiment includes an antenna 10, a circulator 20, a low noise amplifier (LNA) 30, first and second down-mixers 31$a$ and 31$b$, a plurality of analog circuits 32$a$ and 32$b$, first and second analog-digital converters (ADCs) 33$a$ and 33$b$, an oscillator 40, a phase shifter 41, a controller 50, a data processing unit 60, a digital-analog converter (DAC) 71, a plurality of amplifiers 72 and 74, and an up-mixer 73.

The antenna 10 receives a signal transmitted from an RFID tag (not shown) and transmits a signal transmitted from the controller 50 to the tag.

The circulator 20 separates a transmission signal Srt and a reception signal Str from each other. When transmission and reception of signals are performed by using a same frequency as in a RFID system, the signals are transmitted in one way only according to an input port, in order to separate the transmission signal Srt and the reception signal Str. To do this, the circulator 20 may include a transmission port that connects to a transmission path, a reception port that connects to a reception path, and an antenna port that connects to the antenna 10. The circulator 20 transfers the reception signal Str that is received through the antenna 10 and input into the antenna port to the LNA 30 that is located in the reception path, and transfers the transmission signal Srt that is input into the transmission port through the transmission path to the antenna 10.

The LNA 30 amplifies the reception signal Str received through the antenna 10. A magnitude of the reception signal Str is in inverse-proportion to a distance between the tag and the reader 1. That is, when the tag and the reader 1 are close to each other, the magnitude of the reception signal Str is large. In addition, as the distance between the tag and the reader 1 increases, the magnitude of the reception signal Str is reduced. In order to increase an identification distance by which the performance of the reader 1 is evaluated, the signal transmitted from the tag that is apart from the reader 1 should be processed precisely. That is, the signal of a small magnitude should be processed precisely. Therefore, the LNA 30 amplifies the reception signal Str transmitted from the tag so that components located in a rear part of the reception path may process the reception signal Str.

The first and second down-mixers 31$a$ and 31$b$ mix the signal output from the LNA 30 with an oscillation signal generated by the oscillator 40 to convert a frequency band of the signal to an intermediate frequency band. Here, the first down-mixer 31$a$ mixes the output signal of the LNA 30 with an oscillation signal, a phase of which is shifted by the phase shifter 41, for example, by 90°, in order to generate a Q-channel analog signal Saq. On the other hand, the second down-mixer 31$b$ mixes the output signal of the LNA 30 with the oscillation signal generated by the oscillator 40 to generate an I-channel analog signal Sai. That is, the reception signal Str is divided into the Q-channel analog signal Saq and the I-channel analog signal Sai by using the first and second down-mixers 31$a$ and 31$b$.

The plurality of analog circuits 32$a$ and 32$b$ include a Q-channel analog circuit 32$a$ and an I-channel analog circuit 32$b$. The Q-channel analog circuit 32$a$ may include a Q-channel filter 321$a$ and a Q-channel amplifier 322$a$. The Q-channel filter 321$a$ is a low pass filter (LPF) that removes high-frequency noise from the input Q-channel analog signal Saq and passes a base-band signal. The Q-channel amplifier 322a amplifies the signal output from the Q-channel filter 321a. Likewise, the I-channel analog circuit 32b may include an I-channel filter 321b and an I-channel amplifier 322b. The I-channel filter 321b is a LPF that removes the high-frequency noise from the input I-channel analog signal Sai and passes a base-band signal. The I-channel amplifier 322b amplifies the signal output from the I-channel filter 321b.

The first ADC 33a and the second ADC 33b respectively convert the analog signals output from the Q-channel analog circuit 32a and the I-channel analog circuit 32b into digital signals, and output a Q-channel digital signal Sdq and an I-channel digital signal Sdi, respectively.

The oscillator 40 generates the oscillation signal having a variable frequency for a frequency hopping according to a control signal Scon from the controller 50.

The phase shifter 41 shifts the oscillation signal generated by the oscillator 40 by a predetermined phase. For example, the phase shifter 41 may shift the oscillation signal by 90° or 180°.

The controller 50 controls each of the components in the reader 1. The controller 50 recovers the Q-channel digital signal Sdq and the I-channel digital signal Sdi as a signal, and performs a decoding operation by using the recovered signal. In addition, the controller 50 encodes a signal that is to be transmitted to the tag and transfers the signal to the antenna 10 through the transmission path.

The controller 50 may include a Q-channel digital filter 51a, an I-channel digital filter 51b, a phase restorer 52, a channel decoder 53, a sampling signal generator 54, a main controller 55, an encoder 56, and a digital modulator 57.

The Q-channel digital filter 51a and the I-channel digital filter 51b only pass certain frequency bands respectively in the Q-channel digital signal Sdq and the I-channel digital signal Sdi. Here, the certain frequency band means a backscatter link frequency (hereinafter, referred to as link frequency) that is a communication speed set between the reader 1 and the tag.

The phase restorer 52 generates a restored signal Sdem as accurate as possible by using the Q-channel digital signal Sdq and the I-channel digital signal Sdi.

The channel decoder 53 receives the restored signal Sdem and performs a decoding operation on the signal according to a predetermined decoding format. The decoding operation of the channel decoder 53 will be described in more detail later with reference to FIGS. 8 through 11.

The sampling signal generator 54 generates a sampling signal Ssmp, for example, a pulse signal, and applies the generated signal to the channel decoder 53. The sampling signal may be a signal of pulse wave, and a frequency of the sampling signal may be suitable for calculating the link frequency in the channel decoder 53. For example, the frequency of the sampling signal may be 1.5 MHz, 3 MHz, or 6 MHz.

The main controller 55 performs overall controlling operations of the reader 1. The main controller 55 receives a decoded signal Sdec that is decoded in the channel decoder 53 and output, and transfers decoded data Dsen to the data processing unit 60 according to the decoded signal Sdec. In addition, the main controller 55 receives tag command data Drec from the data processing unit 60, and transfers a tag command signal Stc to the encoder 56 according to the tag command data Drec. In addition, the main controller 55 generates control signals Scon for performing the overall control of the reader 1, and transfers the control signals Scon to corresponding components.

The encoder 56 receives the tag command signal Stc from the main controller 55, and performs an encoding operation of the tag command signal Stc. The encoder 56 transfers the encoded signal Senc to the digital modulator 57.

The digital modulator 57 receives the encoded signal Senc from the encoder 56, and modulates the received signal into a digital type. The digital modulator 57 transmits the digital modulation signal Sdm to the DAC 71.

The data processing unit 60 receives the decoded data Dsen from the main controller 55 and performs a data processing operation. The data processing unit 60 may be an additional server separate from the reader 1, or may be integrally formed with the reader 1. The data processing unit 60 transmits the tag command signal Drec to the main controller 55 according to the data processing result.

The DAC 71 converts the digital modulation signal Sdm transmitted from the digital modulator 57 into an analog modulation signal Sam.

The first amplifier 72 amplifies the analog modulation signal Sam, and the up-mixer 73 mixes the oscillation signal generated by the oscillator 40 with the amplified analog modulation signal Sam so that the frequency of the transmission signal Srt may be adjusted to the communication frequency band of the tag. The second amplifier 74 amplifies the transmission signal Srt output from the up-mixer 73 and transmits the amplified transmission signal Srt to the circulator 20, and the transmission signal Srt is transmitted to the tag through the antenna 10.

Figure 2:
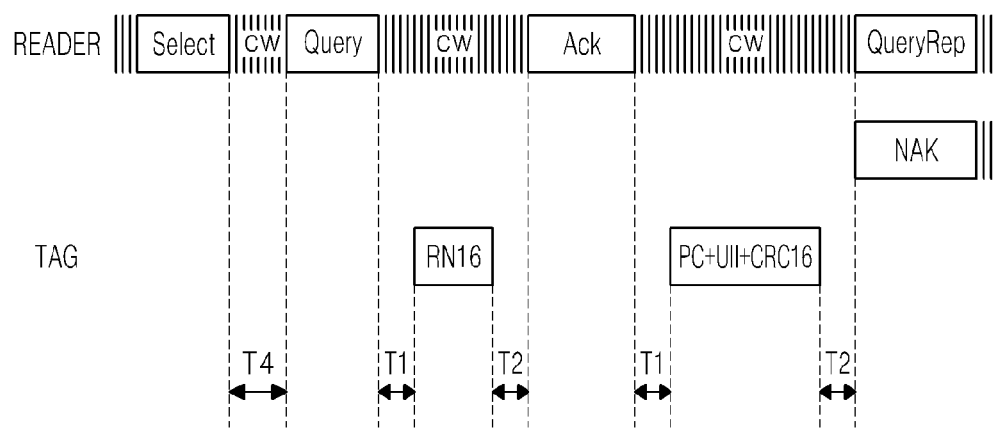
FIG. 2 is a diagram of an order of communication between an RFID tag and an RFID reader in a RFID system, according to an exemplary embodiment.

FIG. 2 is a diagram of an order of communication between the tag and the reader 1 in the RFID system, according to an exemplary embodiment, and FIG. 3 is a table of link frequencies according to DR values and TRcal values in the tag, according to an exemplary embodiment.

Referring to FIG. 2, a select command signal is transmitted from the reader 1 to the tag according to the specification of ISO/IEC 18000-6, and then, a query command signal is transmitted from the reader 1 to the tag. The tag transmits an RN16 response signal to the reader 1 in response to the query command signal, and the reader 1 receives the RN16 response signal. The reader 1 transmits an Ack command signal to the tag in response to the RN16 response signal, and the tag transmits a PC+UII+CRC16 response signal to the reader 1.

Here, a preamble that is transmitted in advance to the query command signal transmitted from the reader 1 to the tag includes a TRcal section, a time period of which may be adjusted, and a fifth bit of the query command signal includes divide ratio (DR) data of one (1) bit. A frequency of the signal transmitted from the tag to the reader 1, that is, the link frequency, is determined according to a length of the TRcal and the DR data value.

Referring to FIG. 3, link frequencies according to the DR values and the TRcal are represented. In addition, a frequency tolerance in each of the link frequencies is represented. For example, when DR=64/3 and TRcal=83.3 us, the link frequency is 256 KHz. However, if there is a frequency tolerance due to various elements in the RFID system, there may be an error of about +/−10% with respect to a normal temperature. In addition, when DR=8 and 25<TRcal<31.25 us, for example, the link frequency becomes 256 kHz<link frequency<320 kHz.

As shown in FIGS. 2 and 3, the link frequency of the signal transmitted from the tag to the reader 1 is determined by the reader 1. However, there are various kinds of link frequencies that may be selected, and the error may be generated due to peripheral elements (for example, temperature, geographical features, or the like). In addition, in some cases, the link frequency determined by the reader 1 may be defined as a certain frequency range, not as a certain frequency. In the related art, the RFID reader is designed to operate with respect to a certain link frequency, and thus, it is impossible for the reader 1 to deal with the above various link frequencies.

FIG. 2 illustrates operations of Type C in the specification of ISO/IEC 18000-6. However, operations of Type B are similar to those of Type C in that the reader 1 initiates communication between the reader 1 and the tag, and commands and data are transmitted between the reader 1 and tag thereafter. In addition, Type B also has the above problem, that is, it is difficult for the reader 1 to deal with the various link frequencies, as described above.

Hereinafter, exemplary embodiments for addressing the above problem will be described in detail as follows.

Figure 6:
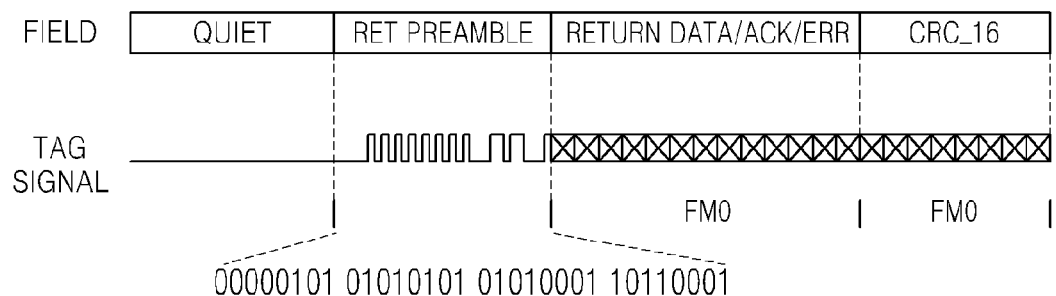
FIG. 6 is a timing diagram of a preamble in a tag signal, according to still another exemplary embodiment.

FIGS. 4 through 6 are timing diagrams of preambles of tag signals, according to an exemplary embodiment.

Referring to FIG. 4, a preamble pattern of a signal that is encoded in an FM0 format by the tag in Type C is shown. TRext is data included in a query command signal transmitted from the reader 1 to the tag, and has a value of 0 or 1. The FM0 preamble having the TRext of the value 1 includes a section that is repeated 12 times as denoted by a dash line block.

Referring to FIG. 5, a preamble pattern of a signal that is encoded in a Miller format by the tag in Type C is shown. Likewise, TRext is data included in a query command signal transmitted from the reader 1 to the tag, and has a value of 0 or 1. In the Miller format, a section that is repeated for a predetermined period exists without regard to the TRext value as denoted by dash line blocks.

FIG. 6 illustrates a preamble pattern of a signal transmitted from the tag to the reader 1 in type B. In a return preamble (RET PREAMBLE) of the signal transmitted from the tag to the reader 1, the section that is repeated for a predetermined period exists as in type C illustrated with reference to FIGS. 4 and 5.

Figure 7:
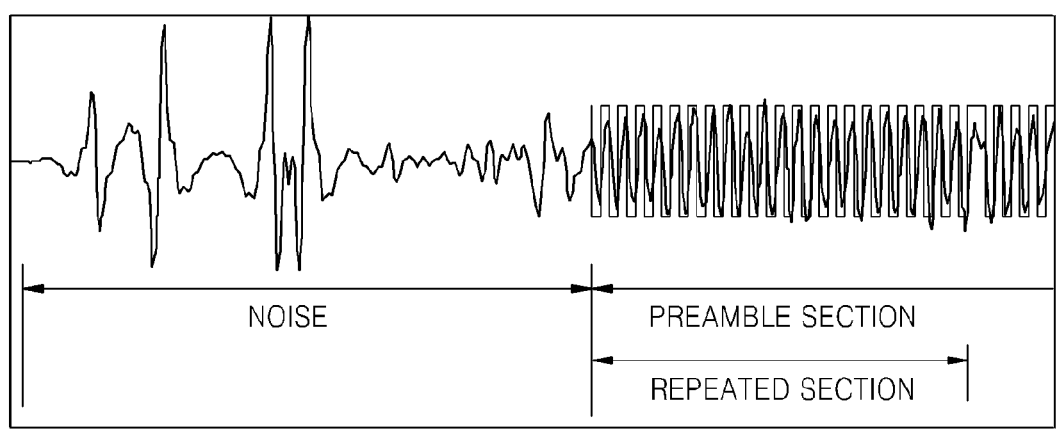
FIG. 7 is a diagram of a signal received by an RFID reader according to an exemplary embodiment.

FIG. 7 is a diagram of a signal received by the reader 1 according to an exemplary embodiment.

FIG. 7 shows a waveform of the signal received through the antenna 10. Referring to FIG. 7, when the signal is not transmitted from the tag to the reader 1, the signal transmitted from the reader 1, for example, the query command signal or a CW signal, may be induced through the reception path of the reader 1. The inducing of the signal is represented as a noise section. On the other hand, when the tag transmits a signal to the reader 1, a signal including data, not noise, is detected. The detected signal includes a preamble that includes the section that is repeated for a predetermined period.

As shown in FIGS. 4 through 7, a length of each of periods in the signal that is encoded in the FM0 or Miller-2/4/8 format of type C is determined by the link frequency. The formats, except for the FM0 format having the TRext value of 0, all include the section in which pulses are repeated constantly, and thus, the reader 1 may determine the link frequency by the repeating section. In addition, in the type B, the return preamble RET PREAMBLE includes the section in which the pulses are repeated, and thus, the reader 1 may determine the link frequency by the repeated section.

<Structure of the Channel Decoder 53>

Figure 8:
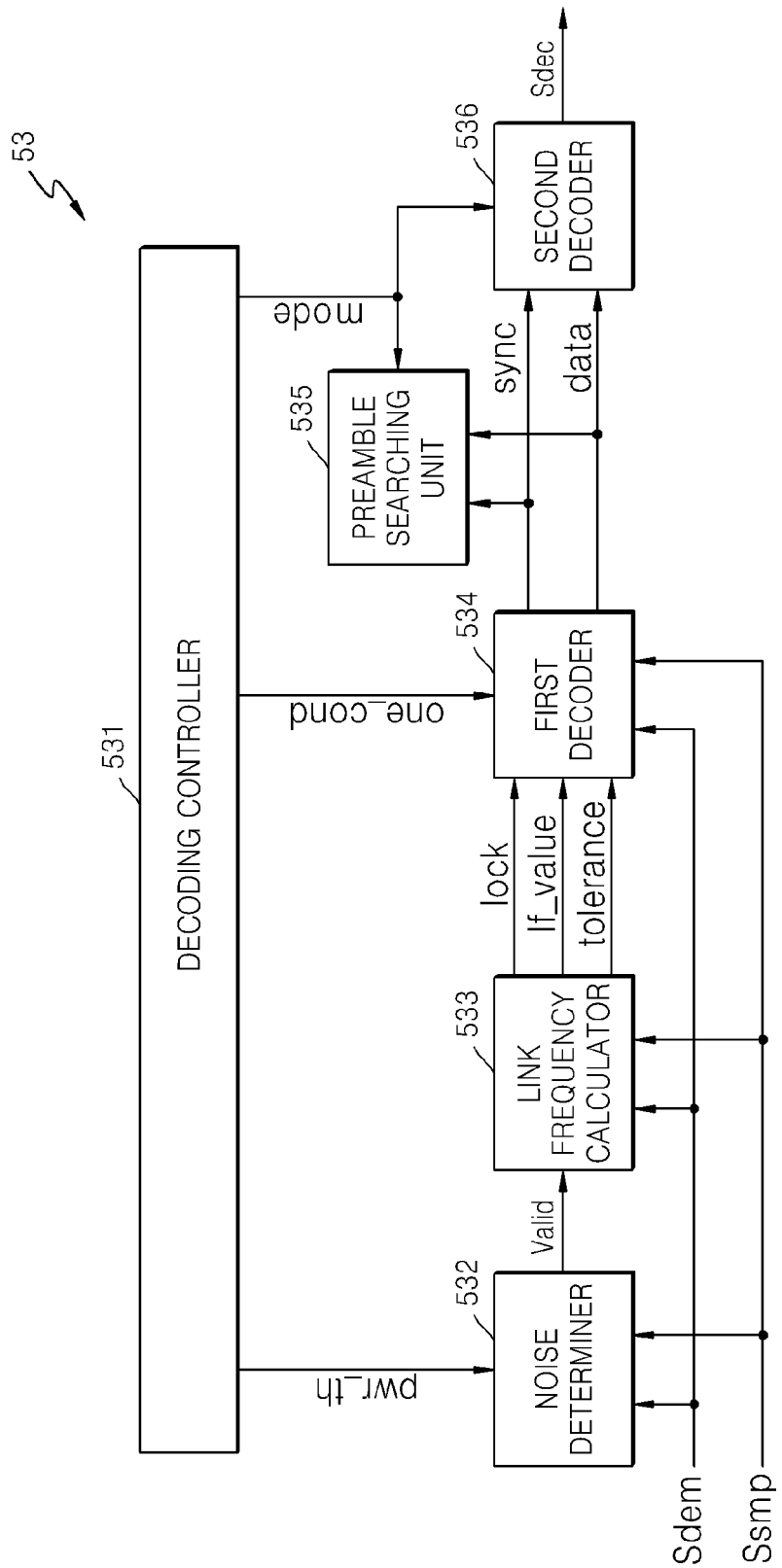
FIG. 8 is a block diagram of a channel decoder according to an exemplary embodiment.

FIG. 8 is a block diagram of the channel decoder 53 according to an exemplary embodiment.

Referring to FIG. 8, the channel decoder 53 includes a decoding controller 531, a noise determiner 532, a link frequency calculator 533, a first decoder 534, a preamble searching unit 535, and a second decoder 536.

—Structure and Operations of the Decoding Controller 531—

The decoding controller 531 performs overall controlling of the channel decoder 53, and transmits various control signals to the components of the channel decoder 53. In more detail, the decoding controller 531 transmits a threshold power value pwr_th, for determining whether the received signal is the noise part or the signal, the data of which is encoded in the tag, to the noise determiner 532. The decoding controller 531 transmits a reference signal one_cond to the first decoder 534 for a first decoding operation. In addition, the decoding controller 531 transmits a mode signal representing the decoding format to the preamble searching unit 535 and the second decoder 536.

—Structure and Operations of the Noise Determiner 532—

The noise determiner 532 receives the restored signal Sdem from the phase restorer 52, and receives the sampling signal Ssmp from the sampling signal generator 54. The noise determiner 532 receives the threshold power value pwr_th from the decoding controller 531, and determines that the received restored signal Sdem is the signal, the data of which is encoded in the tag, when the restored signal Sdem that is sampled by using the sampling signal Ssmp is maintained equal to or greater than the threshold power value pwr_th for a predetermined time or longer. That is, the noise determiner 532 distinguishes the noise part and the signal part, the data of which is encoded by the tag, from the received restored signal Sdem.

The noise determiner 532 applies a valid signal Valid to the link frequency calculator 533 when it is determined that the restored signal Sdem is the signal encoded by the tag. For example, the noise determiner 532 outputs a low level signal as the valid signal Valid at the noise part, and outputs a high level signal as the valid signal Valid at the signal part encoded in the tag. The method of determining the time of applying the valid signal Valid is not limited to the above description. For example, according to the specification of ISO/IEC 18000-6, a time period from the time when the reader 1 transmits a signal to the tag to the time when the reader 1 receives the signal transmitted from the tag is defined as T1 (refer to FIG. 2), the valid signal Valid may be output at a point where the noise part is minimized within the time period T1. That is, the time when it is determined that the restored signal Sdem is the signal encoded by the tag may set variously.

The link frequency calculator 533, the first decoder 534, the preamble searching unit 535, and the second decoder 536 that will be described later perform operations with respect to the part that is determined as being encoded in the tag by the noise determiner 532.

—Structure and Operations of the Link Frequency Calculator 533—

The link frequency calculator 533 receives the restored signal Sdem from the phase restorer 52, and receives the sampling signal Ssmp from the sampling signal generator 54. In addition, the link frequency calculator 533 receives the valid signal Valid from the noise determiner 532. When the link frequency calculator 533 receives the valid signal Valid from the noise determiner 532, the link frequency calculator 533 calculates the link frequency by using the restored signal Sdem and the sampling signal Ssmp. The receipt of the valid signal Valid from the noise determiner 532 means that the reader 1 starts to receive the signal encoded by the tag, and thus, the repeated section included in the preamble is shown as illustrated in FIGS. 4 through 6. The link frequency calculator 533 calculates the link frequency by using the repeated section. Hereinafter, the method of calculating the link frequency will be described with reference to FIGS. 9 through 11.

Figure 9:
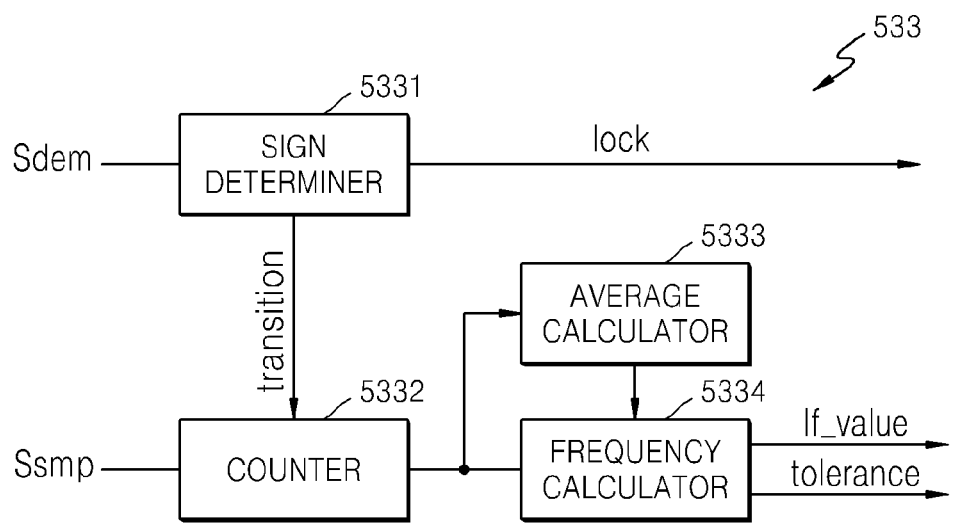
FIG. 9 is a block diagram of a link frequency calculation unit according to an exemplary embodiment.
Figure 10:
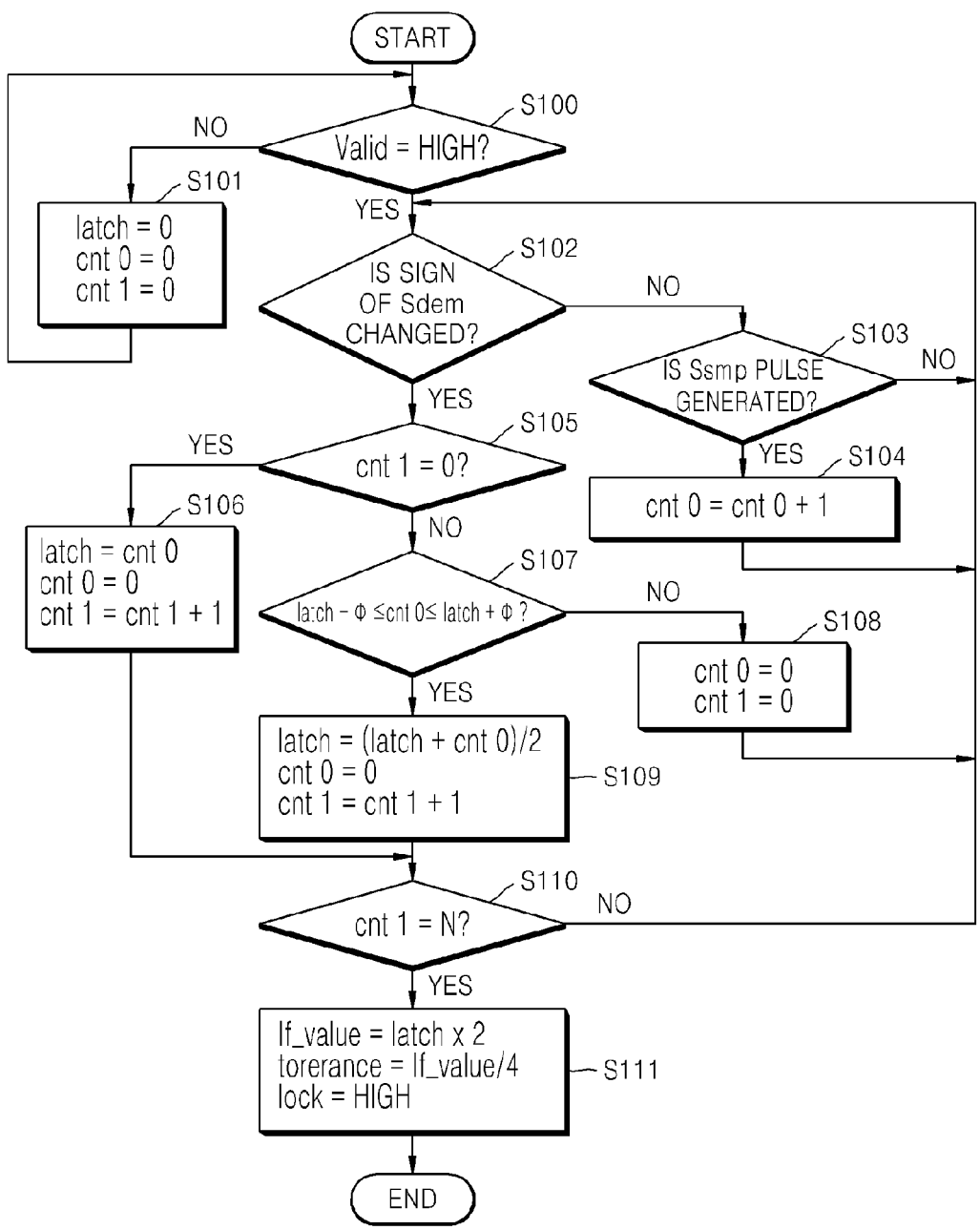
FIG. 10 is a flowchart of a method of calculating a link frequency according to an exemplary embodiment.
Figure 11:
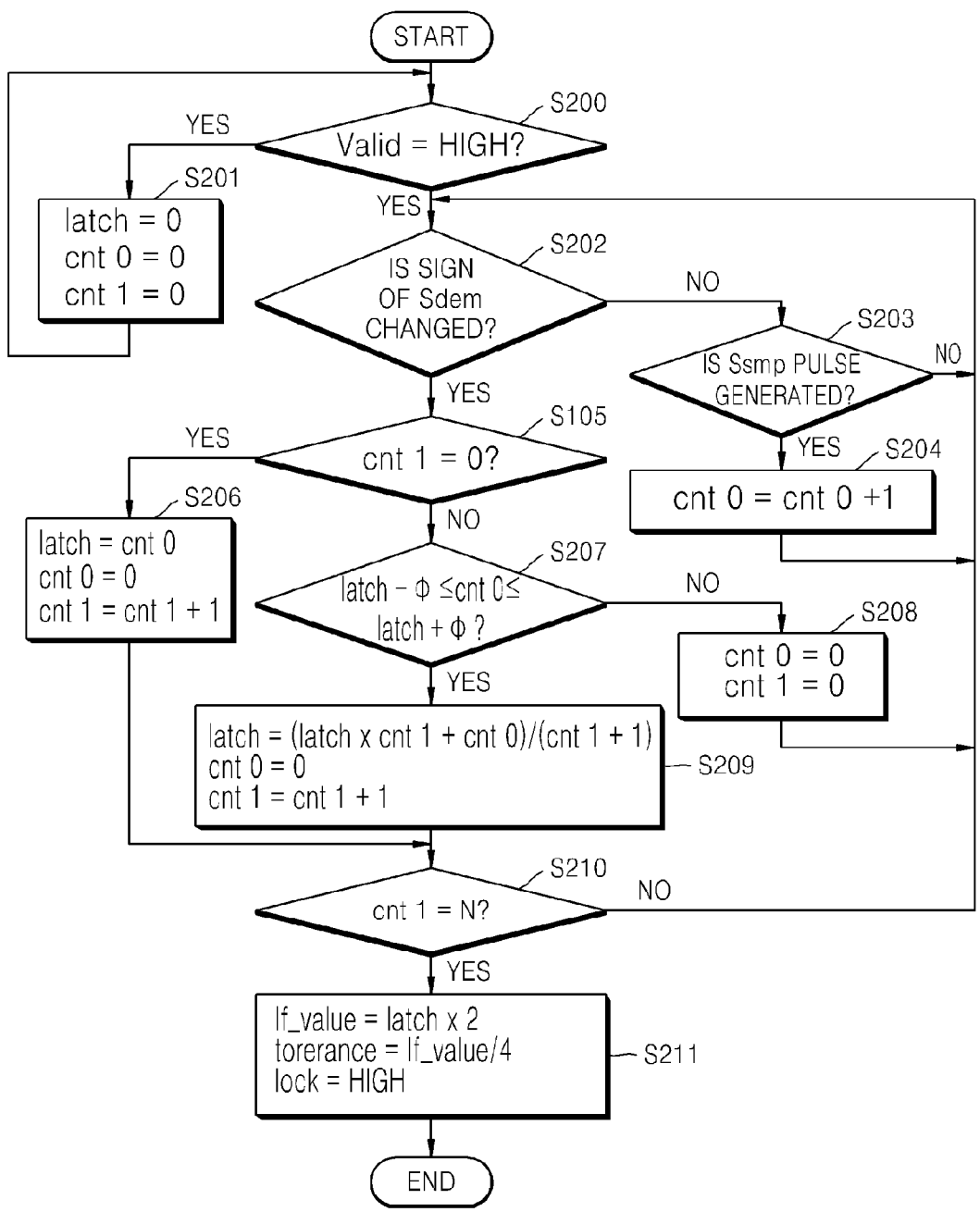
FIG. 11 is a flowchart of a method of calculating a link frequency according to another exemplary embodiment.

FIG. 9 is a block diagram of the link frequency calculator 533 according to an exemplary embodiment. FIGS. 10 and 11 are flowcharts of methods of calculating the link frequency according to exemplary embodiments.

Referring to FIG. 9, the link frequency calculator 533 of the current embodiment may include a sign determiner 5331, a counter 5332, an average calculator 5333, and a frequency calculator 5334.

The sign determiner 5331 receives the restored signal Sdem and determines whether the sign of the restored signal Sdem changes. For example, the sign determiner 5331 determines whether the restored signal Sdem changes from positive to negative, or from negative to positive. The sign of the restored signal Sdem may be determined as negative when the restored signal Sdem is less than a threshold value, for example, an offset value, and as positive when the restored signal Sdem is greater than the threshold value. The sign determiner 5331 applies a transition signal transition to the counter 5332 when the sign of the restored signal Sdem changes. In addition, the sign determiner 5331 transmits a lock signal lock to the first decoder 534 when it is determined that the sign has changed as many as the number set in the restored signal Sdem.

The counter 5332 counts the number of sampling signal Ssmp applications from the time when a transition signal is applied from the sign determiner 5331 to the time when a next transition signal is received. That is, the number of times the sampling signal Ssmp is applied is calculated during when the sign of the received restored signal Sdem is consistent. For example, if the sampling signal Ssmp is a pulse signal, the number of pulses applied between the two successive transition signals is counted.

The average calculator 5333 calculates an average value of the number of sampling signal Ssmp applications between two successive transition signals counted by the counter 5332. Here, the average calculator 5333 may calculate an actual average value of the number of sampling signals Ssmp applications between two successive transition signals, or may calculate a value similar to the average value.

The frequency calculator 5334 calculates the link frequency based on the average value calculated by the average calculator 5333. For example, it is assumed that the sampling frequency of the sampling signal Ssmp is a pulse wave of 3 MHz and the average value is 10. The number of sampling signal Ssmp applications during one period of the restored signal Sdem is 10×2=20, and the period of one sampling signal Ssmp is 1/3 M. Therefore, a length of one period in the restored signal Sdem is 20/3 M, and the frequency is 3 MHz/20=150 kHz.

The frequency calculator 5334 may calculate a tolerance ($\phi$) based on the calculated link frequency. The tolerance ($\phi$) denotes an error range of the link frequency, and may be set variously according to usage environment. For example, the tolerance ($\phi$) may be set as ±25%, ±10%, or the like of the link frequency.

Hereinafter, a method of calculating the link frequency in the link frequency calculator 533 will be described in detail.

FIG. 10 is a diagram illustrating a method of calculating a value that is similar to the average value, not the actual average value, when the values of counting the number of sampling signal Ssmp applications is averaged.

Referring to FIG. 10, the link frequency calculator 533 determines whether a high level signal is transmitted from the noise determiner 532 as the valid signal Valid (S100). If a low level signal is transmitted as the valid signal Valid, values of latch, cnt0, and cnt1 are set as 0 to be initialized (S101). Here, the latch represents an average value of the number of sampling signal Ssmp applications between two successive transition signals calculated by the average calculator 5333. The cnt0 represents the number of sampling signal Ssmp applications from the time when a transition signal is applied from the sign determiner 5331 to the time when a next transition signal is received. The cnt1 represents the number of the repeated section included in a preamble.

If it is determined that the high level signal is transmitted as the valid signal Valid in operation S100, the sign determiner 5331 determines whether the sign of the restored signal Sdem changes (S102). The receipt of high level signal as the valid signal Valid means that the repeated section in the preamble is started in the restored signal Sdem. In addition, the change of sign of the restored signal Sdem means that half of the period according to the link frequency has passed.

If it is determined that the sign of the restored signal Sdem does not change, it is determined in the counter 5332 whether a pulse is generated as the sampling signal Ssmp (S103). If the pulse is not generated as the sampling signal Ssmp, the method goes to operation S102 to determine whether the sign of the restored signal Sdem changes. If it is determined that the pulse is generated as the sampling signal Ssmp (S103), the counter 5332 adds 1 to the value of cnt0, and then, stores the added result as cnt0 (S104). That is, the number of sampling signal Ssmp applications is counted.

If it is determined that the sign of the restored signal Sdem changes (S102), the sign determiner 5331 applies a transition signal transition to the counter 5332. Then, it is determined whether the value of cnt1 is 0 (S105).

If it is determined that the value of cnt1 is not 0 in operation S105, it is determined whether an inequality latch−$\phi$≤cnt0≤latch+$\phi$ is satisfied (S107). If the value of cnt0 does not satisfy the above condition, values of cnt0 and cnt1 are both initialized to zero (S108), because the link frequency is calculated when the signal transmitted from the tag is maintained at a constant frequency for a predetermined time. If the value of cnt0 satisfies the above condition (S107), the average calculator 5333 stores a value, which is obtained by adding the value stored as latch and the value stored as cnt0, and then, dividing the added value by 2, as the latch. That is, a similar average, not the actual average, is calculated. In addition, 0 is stored as cnt0 to initialize the cnt0, and 1 is added to the value stored as cnt1, and then, the added result is stored again as cnt1 (S109). The calculation of the value of latch illustrated in operation S109 is not the actual calculation of the average value, however, the calculation value approaches the actual average value as the number of calculation operations increases. Thus, an error generated by the method illustrated in operation S109 may be ignored. If, however, it is determined that the value of cnt1 is 0 in operation S105, the average calculator 5333 stores the value stored as cnt0 as the latch, cnt0 is set to 0, and 1 is added to the valued stored as cnt1 (S106).

After operation S109, it is determined whether the value of cnt1 is N, which is set in advance (S110). Here, N denotes the number of counting operations in order to calculate the average value. When the link frequency is calculated after performing one counting operation, there may be a large error. Therefore, the counting operation is repeated N times, and then, the average value of the counting numbers is calculated in order to calculate an accurate link frequency.

If the value of cnt1 is not N, the method goes to operation S102. Otherwise, if the value of cnt1 is N, the value of latch×2 is defined as a value of If_value that corresponds to the link frequency. In addition, a value of If_value/4 is defined as a tolerance value, and a lock signal lock is transmitted to the first decoder (S111). For example, if the average value calculated in the repeated section of the restored signal Sdem, that is, the value of latch, is 10, the value of If_value becomes 20, and the tolerance value becomes 5. In the current exemplary embodiment, the tolerance range is set as ±25% of the link frequency; however, the inventive concept is not limited thereto. The units of the values of If_value and the tolerance are the number of times, not Hz. The actual link frequency and the tolerance may be calculated by using the values of If_value and the tolerance, and the frequency of the sampling signal Ssmp. For example, if the value of If_value is 20 and the frequency of the sampling signal Ssmp is 3 MHz, the link frequency is 150 kHz and the tolerance is about ±37.5 kHz.

The link frequency and the tolerance may be calculated by the above calculation method.

Hereinafter, another method of calculating the link frequency by the link frequency calculator 533 will be described in detail.

FIG. 11 is a flowchart of a method of calculating an actual average value of the values of counting the number of sampling signal Ssmp applications, according to an exemplary embodiment.

The method illustrated in FIG. 11 is different from the method of calculating the link frequency and the tolerance illustrated in FIG. 10 in that a value of (latch×cnt1+cnt0)/(cnt1+1) is stored as the value of latch, in operation S209. The above-described operation S209 is performed to calculate the actual average of the counting numbers. The descriptions about operations S200 through S208, S210, and S211 will not be provided, and the link frequency and the tolerance may be calculated by using the method illustrated in FIG. 11.

—Structure and Operations of the First Decoder 534—

The first decoder 534 performs a decoding operation for converting the restored signal Sdem into a first signal, which is a combination of 0 and/or 1 signal, or a second signal that is different from the first signal. If necessary, the first decoder 534 may convert the restored signal Sdem into a third signal that is different from the first and second signals. Then, the first decoder 534 may convert the restored signal Sdem into one of the first through third signals. The first decoder 534 receives the reference signal one_cond that represents a reference value for converting the signal from the decoding controller 531, and receives a lock signal lock, an If_value signal, and a tolerance signal tolerance from the link frequency calculator 533.

The decoding operation of the first decoder 534 will be described as follows.

The first decoder 534 determines the change in sign of the restored signal Sdem after a high level signal is applied thereto as the lock signal lock.

The first decoder 534 counts the number of sampling signal Ssmp applications from the time when the sign of the restored signal Sdem changes. And the first decoder 534 calculates a conversion value by adding 1 when the restored signal Sdem is greater than 0 or subtracting 1 when the restored signal Sdem is smaller than 0 at the time when the sampling signal Ssmp is applied to the first decoder 534, and then, stores the conversion value. The restored signal Sdem is converted to one of the first through the third signals according to the conversion value. In addition, the first decoder 534 compares the number of sampling signal Ssmp applications which is counted from the time when the sign of the restored signal Sdem changes until the time of a next change of the sign of the restored signal Sdem with the value of If_value and the tolerance value transmitted from the link frequency calculator 533.

$$\text{If\_value}-\text{tolerance}>n \quad (1),$$

where n is the counted number of sampling signal Ssmp applications. If the counted number n of sampling signal Ssmp applications until the next change of sign of the restored signal Sdem satisfies the above inequality 1, the first decoder 534 determines that the received restored signal Sdem has not passed a period according to the link frequency, for example, in a case when the value of If_value is 20, the tolerance value is 2, and n is 10. The first decoder 534 continues to perform the counting operation until the sign of the restored signal Sdem changes again, and the value of n increases whenever the sampling signal Ssmp is applied to the first decoder. In addition, the first decoder 534 continues to calculate the conversion value.

$$\text{If\_value}-\text{tolerance}\leq n \leq \text{If\_value}+\text{tolerance} \quad (2)$$

If the value of n satisfies the above inequality (2), the first decoder 534 determines that the received restored signal Sdem has passed a period according to the link frequency, for example, in a case where the value of If_value is 20, the tolerance value is 2, and n is in a range of 18 to 22. In this case, the first decoder 534 applies a synchronization signal sync to the preamble searching unit 535 and the second decoder 536, and converts the restored signal Sdem to one of the first and second signals. Here, an absolute value of the conversion value that is calculated during the counting operation is compared with the reference value in the reference signal one_cond received from the decoding controller 531. If the absolute value of the conversion value is less than the reference value in the reference signal one_cond, the restored signal Sdem is converted into the first signal, and if the absolute value of the conversion value is equal to or greater than the reference value, the restored signal Sdem is converted into the second signal. In addition, the first decoder 534 initializes the counting number and the conversion value so as to repeat the counting operation and the calculation of the conversion value.

$$\text{If\_value}+\text{tolerance}<n \quad (3)$$

In some cases, n may satisfy the above inequality (3). In this case, the first decoder 534 converts the restored signal Sdem to the third signal. In addition, the first decoder 534 initializes the counting number and the conversion value so as to repeat the counting operation and the calculation of the conversion value.

Hereinafter, the decoding operation of the first decoder 534 will be described in more detail with reference to FIGS. 12 through 15.

Figure 12:
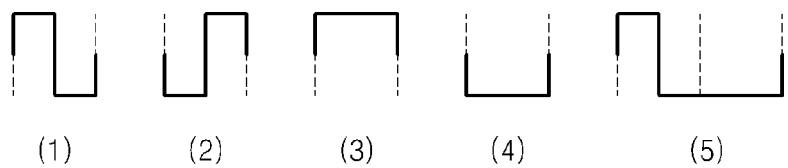
FIGS. 12 and 13 are diagrams of a signal converting method of a first decoder, according to an exemplary embodiments.
Figure 13:
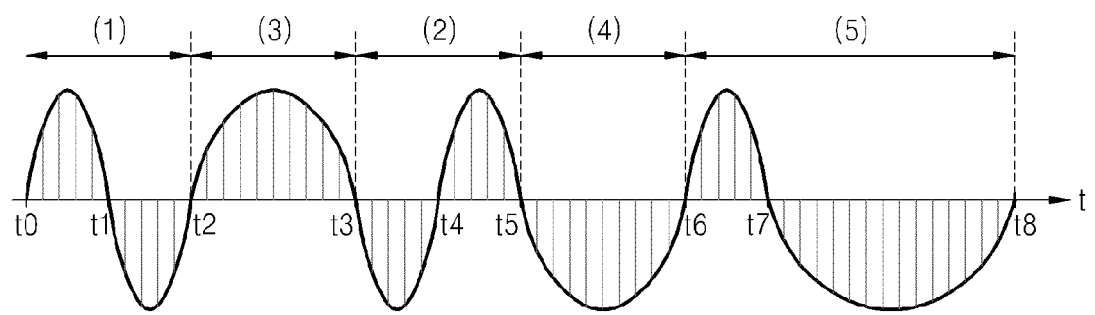

FIGS. 12 and 13 are diagrams of a method of converting signals in the first decoder 534, according to an exemplary embodiment, and the method illustrated in FIGS. 12 and 13 may be applied to a case where the restored signal Sdem is encoded in the tag in the FM0 (TRext=1) format. FIG. 12 shows a converted signal (data) converted and output by the first decoder 534, and FIG. 13 shows the restored signal Sdem input into the first decoder 534.

Referring to FIG. 12, signals (1) through (5) that may be output when the decoding format is FM0 (TRext=1) are shown (refer to FIG. 4). Signals (1) and (2) are examples that may be output when the first decoder 534 converts the restored signal Sdem into the first signal. The first signal means that the sign of the restored signal Sdem changes two times during one period of the link frequency, and the magnitude of the restored signal Sdem changes from 0 to 1 or from 1 to 0. Signals (3) and (4) are examples that may be output when the first decoder 534 converts the restored signal Sdem into the second signal. The second signal means that the sign of the restored signal Sdem changes once during one period of the link frequency, and the magnitude does not change. The signal (5) is an example that may be output when the first decoder 534 converts the restored signal Sdem into the third signal. The third signal corresponds to a case where the sign of the restored signal Sdem changes twice during two periods of the link frequency and values of 0 and V are successively shown in the preamble of the FM0 format, as shown in FIG. 4.

FIG. 13 shows waveforms of the signals actually transmitted to the reader 1. The decoding operation of the first decoder 534 will be described in detail with reference to FIG. 13. A horizontal axis denotes time, and a longitudinal axis denotes the magnitude of the restored signal Sdem. In addition, scales of the horizontal axis represent the times when the sampling signal Ssmp is applied. It is assumed that If_value=10, tolerance=2, and the reference value in the reference signal one_cond=2.

Referring to FIG. 13, the sign of the restored signal Sdem changes at a point t0. The first decoder 534 performs the counting operation and the calculation of the conversion value until a point t1 where the next change of the sign of the restored signal Sdem occurs. The counting value at t1 is 5. In a section from t0 to t1, in a time when the first sampling signal Ssmp is applied, the restored signal Sdem is greater than 0, thus the conversion value is 1. Then in a time when the second sampling signal Ssmp is applied, the restored signal Sdem is greater than 0, thus the conversion value is 2 by adding 1 to the previous conversion value 1. In this way, the conversion value is calculated to a time when the fourth sampling signal Ssmp is applied, and the conversion value is 4. Then, in a time when the fifth sampling signal Ssmp is applied, the restored signal Sdem is 0, thus the conversion value remains 4 by not adding 1 to the previous conversion value 4. Thus, the conversion value in a section from t0 to t1 is 4. Since the counting value is less than 8 (If_value−tolerance), the first decoder 534 continues to perform the counting operation and the calculation of the conversion value.

In addition, the first decoder 534 compares the counting value with conditions of inequalities (1) through (3) at a point t2 where the next change of the sign of the restored signal Sdem occurs. Since the counting value at t2 is 10, inequality (2) is satisfied. In addition, the first decoder 534 calculates the conversion value in a section from t1 to t2. In a time when the sixth sampling signal Ssmp is applied, the restored signal Sdem is smaller than 0, thus the conversion value is −1. Then in a time when the seventh sampling signal Ssmp is applied, the restored signal Sdem is smaller than 0, thus the conversion value is −2 by subtracting 1 from the previous conversion value −1. In this way, the conversion value is calculated to a time when the ninth sampling signal Ssmp is applied, and the conversion value is −4. Then, in a time when the tenth sampling signal Ssmp is applied, the restored signal Sdem is 0, thus the conversion value remains −4 by not subtracting 1 to the previous conversion value −4. Thus, the conversion value in a section from t1 to t2 is −4. Thus, the conversion value becomes 0 from a section from t0 to t2. Therefore, the first decoder 534 converts the restored signal Sdem in the section from t0 to t2 into the first signal as shown in signal (1) of FIG. 12, and then, outputs the converted signal.

When the sign of the restored signal Sdem changes at t2, the first decoder 534 restarts the counting operation and the calculation of the conversion value. In a section from t2 to t3, the counting value is 10 and the conversion value is 9. In a time when the first sampling signal Ssmp is applied, the restored signal Sdem is greater than 0, thus the conversion value is 1. Then in a time when the second sampling signal Ssmp is applied, the restored signal Sdem is greater than 0, thus the conversion value is 2 by adding 1 to the previous conversion value 1. In this way, the conversion value is calculated to a time when the ninth sampling signal Ssmp is applied, and the conversion value is 9. Then, in a time when the tenth sampling signal Ssmp is applied, the restored signal Sdem is 0, thus the conversion value remains 9 by not adding 1 to the previous conversion value 9. Thus, the conversion value in a section from t2 to t3 is 9. The first decoder 534 compares the counting value with the conditions of inequalities (1) through (3) at t3. The counting value satisfies inequality (2). In addition, the absolute value of the conversion value is equal to or greater than the reference value. Therefore, the first decoder 534 converts the restored signal Sdem in the section from t2 to t3 into the second signal shown as signal (3) of FIG. 12, and then, outputs the converted signal.

Likewise, the restored signal Sdem in a section from t3 to t6 is also converted into the first signal or the second signal.

When the first decoder 534 restarts the counting operation and the calculation of the conversion value due to the change of the sign of the restored signal Sdem at t6, the counting value at t7 is 5 and the first decoder 534 continues to perform the counting operation and the calculation of the conversion value. However, when the sign of the restored signal Sdem changes again at t8, the counting value is 20 and the conversion value is −10. In a section from t6 to t7, in a time when the first sampling signal Ssmp is applied, the restored signal Sdem is greater than 0, thus the conversion value is 1. Then in a time when the second sampling signal Ssmp is applied, the restored signal Sdem is greater than 0, thus the conversion value is 2 by adding 1 to the previous conversion value 1. In this way, the conversion value is calculated to a time when the fourth sampling signal Ssmp is applied, and the conversion value is 4. Then, in a time when the fifth sampling signal Ssmp is applied, that is at t7, the restored signal Sdem is 0, thus the conversion value remains 4. In a section from t7 to t8, in a time when the sixth sampling signal Ssmp is applied, the restored signal Sdem is smaller than 0, thus the conversion value is −1. Then in a time when the seventh sampling signal Ssmp is applied, the restored signal Sdem is smaller than 0, thus the conversion value is −2 by subtracting 1 from the previous conversion value −1. In this way, the conversion value is calculated to a time when the nineteenth sampling signal Ssmp is applied, and the conversion value is −14. Then, in a time when the twentieth sampling signal Ssmp is applied, the restored signal Sdem is 0, thus the conversion value remains −14 by not subtracting 1 to the previous conversion value −14. Since the counting value satisfies inequality (3), the first decoder 534 converts the restored signal Sdem into the third signal and outputs the converted signal.

Figure 14:
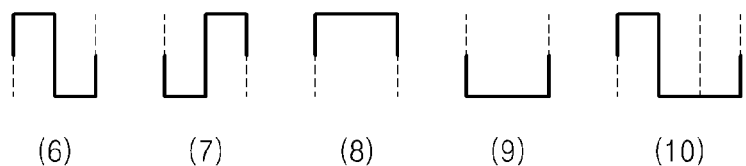
FIGS. 14 and 15 are diagrams of a signal converting method of a first decoder, according to another exemplary embodiment.
Figure 15:
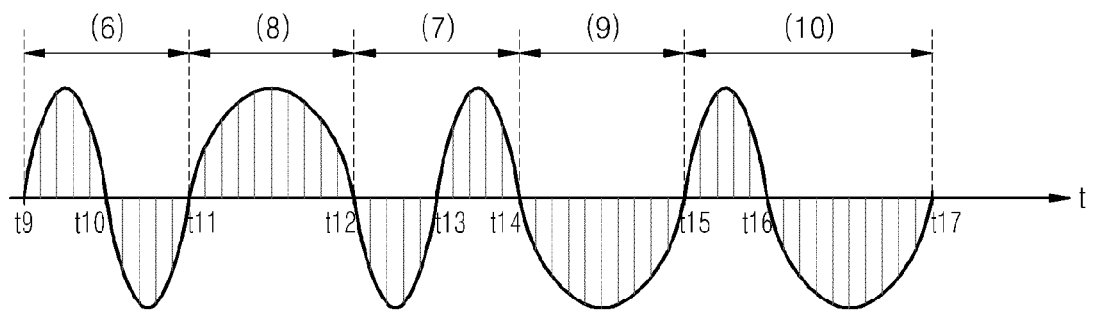

FIGS. 14 and 15 are diagrams of a method of converting the signal by the first decoder 534, according to an exemplary embodiment, and the method illustrated in FIGS. 14 and 15 may be applied to a case where the restored signal Sdem is encoded in the tag in the Miller-2/4/8 format. FIG. 14 shows converted signals (data) converted and output by the first decoder 534, and FIG. 15 shows the restored signal Sdem input into the first decoder 534.

Referring to FIG. 14, signals (6) through (10) that may be output when the decoding format is Miller-2/4/8 are shown (refer to FIG. 5). Signals (6) and (7) are examples that may be output when the first decoder 534 converts the restored signal Sdem into the first signal. The first signal means that the sign of the restored signal Sdem changes two times during one period of the link frequency, and the magnitude changes from 0 to 1 or from 1 to 0. Signals (8) and (9) are examples that may be output when the first decoder 534 converts the restored signal Sdem into the second signal. The second signal means that the sign of the restored signal Sdem changes once during one period of the link frequency, and the magnitude does not change. The signal (10) is an example that may be output when the first decoder 534 converts the restored signal Sdem into the third signal. The third signal corresponds to a case where the sign of the restored signal Sdem changes twice during one and a half periods of the link frequency, and the phase change occurs at odd-numbered position only with respect to data '1' of the Miller–2/4/8 format.

FIG. 15 illustrates waveforms of the signals actually transmitted to the Reader 1. The decoding operation of the first decoder 534 will be described in detail with reference to FIG. 15. A horizontal axis denotes time, and a longitudinal axis denotes the magnitude of the restored signal Sdem. In addition, scales of the horizontal axis represent the times when the sampling signal Ssmp is applied. It is assumed that If_value=10, tolerance=2, and the reference value=2.

The decoding method in the section from t9 to t15 of FIG. 15 is the same as the method in the section from t0 to t6 of FIG. 12, and thus, detailed descriptions thereof will not be provided.

On the other hand, when the first decoder 534 restarts the counting operation and the calculation of the conversion value due to the change of the sign of the restored signal Sdem at t15, the counting value at t16 is 5, and thus, the first decoder 534 continues to perform the counting operation and the calculation of the conversion value. However, when the sign of the restored signal Sdem changes again at t17, the counting value becomes 15 and the conversion value is −5 in a section from t15 to t17. In a section from t15 to t16, in a time when the first sampling signal Ssmp is applied, the restored signal Sdem is greater than 0, thus the conversion value is 1. Then in a time when the second sampling signal Ssmp is applied, the restored signal Sdem is greater than 0, thus the conversion value is 2 by adding 1 to the previous conversion value 1. In this way, the conversion value is calculated to a time when the fourth sampling signal Ssmp is applied, and the conversion value is 4. Then, in a time when the fifth sampling signal Ssmp is applied, that is at t16, the restored signal Sdem is 0, thus the conversion value remains 4. In a section from t16 to t17, in a time when the sixth sampling signal Ssmp is applied, the restored signal Sdem is smaller than 0, thus the conversion value is −1. Then in a time when the seventh sampling signal Ssmp is applied, the restored signal Sdem is smaller than 0, thus the conversion value is −2 by subtracting 1 from the previous conversion value −1. In this way, the conversion value is calculated to a time when the fourteenth sampling signal Ssmp is applied, and the conversion value is −9. Then, in a time when the fifteenth sampling signal Ssmp is applied, the restored signal Sdem is 0, thus the conversion value remains −9 by not subtracting 1 to the previous conversion value −9. Thus, the conversion value becomes −9 in a section from t15 to t17. Since the counting value satisfies inequality (3), the first decoder 534 converts the restored signal Sdem into the third signal shown as signal (10) of FIG. 14, and outputs the converted signal.

On the other hand, in a case of type B, the signal encoded in the tag is transmitted from the tag to the reader 1 in an order of 00000/10101010101010/1000/11/011/0001/ in the return preamble section (RET PREAMBLE) (/ is inserted for the convenience of description, and the link frequency is calculated in a section in which the '10' pulse is repeated in the second section). In addition, in the next section, a signal that is encoded in the FM0 format in the tag is transmitted from the tag to the reader 1. In the case of type B, the restored signal Sdem is also converted into one of the first through third signals through the counting operation and the calculation of the conversion value, as in FIGS. 12 through 15. Here, in the type B, '1000' of the third section, '011' of the fifth section, and '0001' of the sixth section in the row of signals in the return preamble do not satisfy inequalities (1) and (2), and thus, the signals in the above sections may be converted into the third signal. In addition, it will be obvious to one of ordinary skill in the art that additional conditions for distinguishing the above three cases from each other are necessary.

Operations of the first decoder 534 are described with reference to FIGS. 12 through 15. In the current exemplary embodiment, the restored signal Sdem is converted into one of the first through third signals based on one period of the link frequency, however, the inventive concept is not limited thereto. For example, the sign of the restored signal Sdem may be determined in every half period of the link frequency without regard to the change in the sign of the restored signal Sdem, and the restored signal Sdem may be converted into the value of 0 or 1.

—Structure and Operations of the Preamble Searching Unit 535—

The preamble searching unit 535 receives a row of the signals that are converted into one of first through third signals by the first decoder 534, that is, converted signals (data) (the signal row consisting of 0 or 1), and searches for the preamble section in the received converted signal (data). In addition, the preamble searching unit 535 receives the synchronization signal sync from the first decoder 534, and receives the mode signal representing the decoding format from the decoding controller 531. The preamble searching unit 535 searches the preamble section corresponding to the decoding format determined by the mode signal in the converted signal (data), and transmits the searching result to the second decoder 536.

—Structure and Operations of the Second Decoder 536—

The second decoder 536 receives the converted signal (data) from the first decoder 534, and finally decodes the received converted signal (data). The decoding format performed by the second decoder 536 is determined by the mode signal transmitted from the decoding controller 531. That is, the second decoder 536 performs decoding of the received signal in one of the FM0 (TRext=1) and Miller-2/4/8 formats of type C, or in FM0 format of type B according to the mode signal.

As described above, the reader 1 of the current exemplary embodiment may directly calculate the link frequency from the signal transmitted from the tag, and performs communication with the tag based on the calculated link frequency. Thus, the RFID system that may be applied to various link frequencies by using software may be provided.

A program such as an algorithm for executing the controlling method according to the exemplary embodiments in the reader 1 may be stored in a recording medium. The recording medium may be a semiconductor recording medium (for example, applicant specific integrated circuit (ASIC)), or a flash memory.

While the exemplary embodiments have been particularly shown and described, it will be understood by those of ordinary skill in the art that various changes in form and details may be made therein without departing from the spirit and scope of the inventive concept as defined by the following claims.

What is claimed is:

1. A radio frequency identification (RFID) reader comprising:
 a link frequency calculator which is configured to calculate a link frequency by using a signal transmitted from a tag and a sampling signal;

a first decoder which is configured to convert the signal transmitted from the tag into a first signal or a second signal having a different value from the first signal;

a decoding controller which is configured to output a mode signal representing a format used to decode the signal converted in the first decoder; and a second decoder which is configured to decode the converted signal according to the mode signal, wherein the first decoder is configured to receive the link frequency and a tolerance from the link frequency calculator and a reference value from the decoding controller, and to convert the signal transmitted from the tag into the first signal or the second signal based on the reference value, the link frequency and the tolerance, and wherein the reference value is a reference for converting the signal transmitted from the tag and the tolerance is an error range of the link frequency.

2. The RFID reader of claim 1, wherein the link frequency calculator comprises:

a sign determiner which is configured to detect a change in a sign of the signal transmitted from the tag, the sign being determined as plus if a value of the signal is above a threshold and as minus if the value of the signal is below the threshold;

a counter which is configured to count a number of sampling signal applications while the sign of the signal is maintained constant in reference to the threshold; and a frequency calculator which is configured to calculate the link frequency based on the counting number.

3. The RFID reader of claim 2, wherein the link frequency calculator further comprises an average value calculator which is configured to calculate an average value of the counted number of the sampling signal applications while the sign of the signal is maintained constant, wherein the frequency calculator is configured to calculate the link frequency by using the average value.

4. The RFID reader of claim 3, wherein the link frequency calculator is configured to calculate the tolerance based on a predetermined proportion of the calculated link frequency.

5. The RFID reader of claim 4, wherein the first decoder is configured to count a number of sampling signal applications, from a time point when the sign of the signal transmitted from the tag changes to a next time point when the sign of the signal transmitted from the tag changes again, and to calculate a conversion value by adding 1 if the value of the signal transmitted from the tag is greater than 0 and subtracting 1 if the value of the signal transmitted from the tag is smaller than 0 at time points when a sampling signal application occurs while the number of the sampling signal applications is counted.

6. The RFID reader of claim 5, wherein the first decoder is configured to convert the signal transmitted from the tag into the first signal if the conversion value is less than the reference value, and to convert the signal transmitted from the tag to the second signal if the conversion value is equal to or greater than the reference value and if (the link frequency - the tolerance) ≤the first decoder count ≤(the link frequency +the tolerance).

7. The RFID reader of claim 5, wherein the first decoder is configured to count the number of the sampling signal applications until the sign of the signal transmitted from the tag changes again, and to calculate the conversion value while the number of the sampling signal applications is counted if (the link frequency - the tolerance) >the number of the sampling signal applications.

8. The RFID reader of claim 1, wherein the first decoder is configured to convert the signal transmitted from the tag into one of the first signal, the second signal, and a third signal, the third signal having a different value from a value of the first signal and a value of the second signal.

9. The RFID reader of claim 1, further comprising a noise determiner which is configured to distinguish noise from a signal encoded at the tag, in the signal transmitted from the tag.

10. The RFID reader of claim 9, wherein the first decoder is configured to convert the encoded signal into the first signal or the second signal.

11. The RFID reader of claim 9, further comprising a preamble searching unit which is configured to search for a preamble section in the encoded signal.

12. The RFID reader of claim 1, wherein the RFID reader is configured to perform communication with the tag based on the link frequency calculated by the link frequency calculator.

13. A method of controlling a radio frequency identification (RFID) reader, the method comprising:

calculating a link frequency by using a signal transmitted from a tag;

performing first decoding which converts the signal transmitted from the tag into a first signal or a second signal having a different value from the first signal;

determining a decoding format that is used to decode the converted signal; and performing second decoding which decodes the converted signal according to the determined decoding format, wherein the performing first decoding converts the signal transmitted from the tag into the first signal or the second signal based on a reference value, the link frequency and a tolerance, and wherein the reference value is a reference for converting the signal transmitted from the tag and the tolerance an error range of the link frequency.

14. The method of claim 13, wherein the calculating the link frequency comprises:

detecting whether a sign of the signal transmitted from the tag changes between plus and minus, the sign being determined as plus if a value of the signal is above a threshold and as minus if the value of the signal is below the threshold;

counting a number of sampling signal applications while the sign of the signal does not change; and calculating the link frequency based on the counted number.

15. The method of claim 14, wherein the calculating the link frequency comprises:

repeating the calculating the number of the sampling signal applications for a predetermined number of times;

calculating an average value of the number of the sampling signal applications; and calculating the link frequency by using the average value.

16. The method of claim 13, further comprising distinguishing noise from a signal encoded at the tag, in the signal transmitted from the tag.

17. The method of claim 16, wherein the performing the first decoding comprises converting the encoded signal into the first signal or the second signal.

18. The method of claim 16, further comprising searching for a preamble in the encoded signal.

19. A radio frequency identification (RFID) reader comprising:

a sampling signal generator which is configured to generate a sampling signal;

a link frequency calculator which is configured to calculate a link frequency by using pulses, that are repeated for a predetermined period in a preamble section included in a signal transmitted from a tag, and the sampling signal; and a decoding controller which is configured to control decoding of the signal transmitted from the tag according to the calculated link frequency.

20. The RFID reader of claim 19, wherein the link frequency calculator is configured to calculate the link frequency by counting a number of sampling signal applications within a pulse width of the pulse that is repeated.

* * * * *